United States Patent [19]

Yaotani et al.

[11] 4,423,902
[45] Jan. 3, 1984

[54] ROOF STRUCTURE FOR AN AUTOMOTIVE VEHICLE

[75] Inventors: Kouichi Yaotani, Akigawa; Masao Tashoh, Kamakura, both of Japan

[73] Assignee: Nissan Motor Company, Ltd., Kanagawa, Japan

[21] Appl. No.: 318,346

[22] Filed: Nov. 5, 1981

[30] Foreign Application Priority Data

Nov. 10, 1980 [JP] Japan .................. 55-160565[U]

[51] Int. Cl.³ .............................................. B60J 7/06
[52] U.S. Cl. .................................................. 296/214
[58] Field of Search ................ 296/214; 403/107, 348, 403/353

[56] References Cited

U.S. PATENT DOCUMENTS 2,711,345 6/1955 Daniels ............................ 296/214
4,143,907 3/1979 Ireland ............................ 296/214

FOREIGN PATENT DOCUMENTS 1157145 7/1969 United Kingdom ................ 296/214
1164974 9/1969 United Kingdom .
1214948 12/1970 United Kingdom .
1250073 10/1971 United Kingdom .
1366183 9/1974 United Kingdom .
2026968 2/1980 United Kingdom .

Primary Examiner—Robert R. Song
Attorney, Agent, or Firm—Schwartz, Jeffery, Schwaab, Mack, Blumenthal & Koch

[57] ABSTRACT

A roof structure for an automotive vehicle includes a roof panel, a roof rail having a plurality of holes, a head lining, a support member fixed at both end thereof to the roof rail for supporting the head lining under the roof panel. The support member is made of a hollow pipe. The support member has an opening near each end thereof. A stopper is separable from the support member and attached to the opening of the support member in such a manner that the stopper engages the roof rail when the ends of the support member are inserted into the respective holes of the roof rail.

8 Claims, 11 Drawing Figures

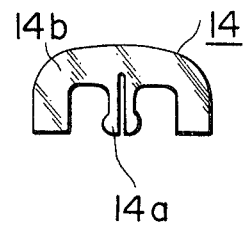
FIG.3A
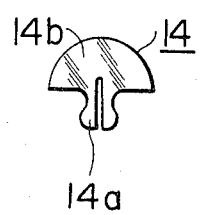
FIG.3B
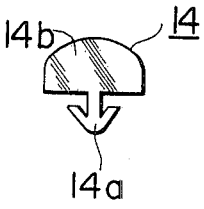
FIG.3C
FIG.4
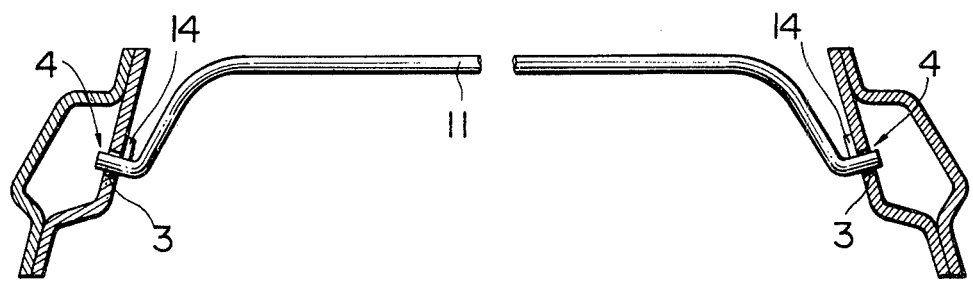
FIG.5
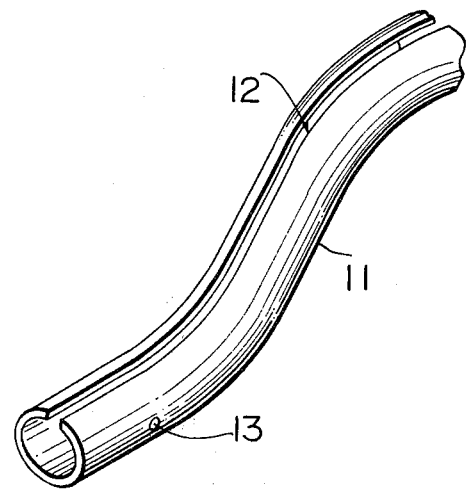

(A)

(B)

ROOF STRUCTURE FOR AN AUTOMOTIVE VEHICLE

BACKGROUND OF THE INVENTION

This invention relates to a roof structure for an automotive vehicle.

FIG. 1 shows a conventional roof structure for an automotive vehicle. A plurality of support members 1 are provided at the upper portion of the automotive vehicle for supporting a head lining (not shown). The support member 1 is made of a rod having no hollow space therein. A projection 2 is formed near each end of the support member 1. When the support member is fixed to a roof rail 3, the projection 2 engages the roof rail 3 so that the insertion of the end portions of the support member 1 into the corresponding holes 4 formed in the roof rail 3 is controlled to a predetermined degree.

In such a conventional roof structure, it is difficult in manufacture to form the projection 2 near each end portion of the support member 1. Also, the distance between the opposing projections 2 must be exactly the same as that between the opposing holes 4 formed in the roof rails 3. If not, the head lining cannot be properly arranged, so that the appearance and quality of the roof structure is poor.

In addition, the support member 1 made from a rod is relatively heavy.

SUMMARY OF THE INVENTION

The object of the present invention is to provide a roof structure for an automotive vehicle in which a support member is light, and the means of controlling the insertion of the end portions of the support member into the corresponding holes formed in the roof rail or rails is simple in construction.

According to the present invention, a roof structure for an automotive vehicle includes a roof panel, a roof rail, a head lining and a support member. The support member is fixed at its ends to the roof rail by inserting the end portions of the support member into the respective holes formed in the roof rail. The support member is made of a hollow pipe and preferably has a slit through its whole length in its longitudinal direction. The support member has an opening or openings near each end thereof. A stopper is attached to the opening of the support member in such a manner that it engages the roof rail when the ends of the support member are inserted into the respective holes of the roof rail. It is preferable that a plurality of openings are formed in the support member in its longitudinal direction because the relative distance between the opposing stoppers can be easily adjusted.

BRIEF DESCRIPTION OF THE DRAWINGS

FIGS. 3A through 3C show three stoppers for use in a roof structure of an automotive vehicle according to the present invention;

FIG. 4 is a schematic front view showing a roof structure for an automotive vehicle according to the present invention in which the support member shown in FIG. 2 is used;

FIG. 5 is a perspective view showing an end portion of a support member according to a further embodiment of the present invention;

DETAILED DESCRIPTION OF THE PREFERRED EMBODIMENTS

Figure 2:
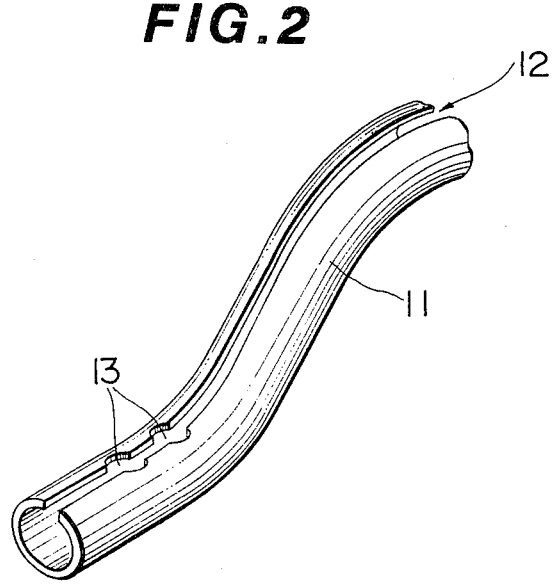
FIG. 2 is a perspective view showing an end portion of a support member for use in a roof structure of a vehicle according to the present invention.

FIG. 2 shows an end portion of a support member 1 according to a preferred embodiment of the present invention. A central portion of the support member 1 is not shown because it is substantially the same as the end portion although the central portion thereof is straight.

The support member 1 is made of a hollow pipe and has a slit 12 in its longitudinal direction through the whole length of the support member 1. In another mode of the present invention, such a slit 12 cannot be omitted.

An opening or openings 13 are formed near each end of the support member 1. In the embodiment shown, the openings 13 are formed in the slit 12 at the top of the support member 1. The openings 13 are positioned at the inner end of the insertion portion of the support member 1 to be inserted into the hole 4 of the roof rail 3. In other words, when the end portion of the support member 1 is inserted into the hole 4 of the roof rail 3, the openings 13 are positioned adjacent to the outer surface of the roof rail 3.

A stopper 14 for controlling the insertion degree of the support member 1 into the hole 4 of the roof rail 3 is made of a synthetic resin or metal. As shown in FIGS. 3A to 3C, the stopper 14 has a leg portion 14a formed in such a shape that it can resiliently change in shape when it is inserted into the opening 13 of the support member 1. Once the leg portion 14a of the stopper 14 is set into the opening 13, it resiliently reverts to its original shape so that it cannot slip out of position. Also, the stopper 14 has a control or stop portion 14b which engages the roof rail 3 in such a way that the insertion degree of the support member 1 into the hole 4 of the roof rail 3 can be controlled or limited.

Figure 6:
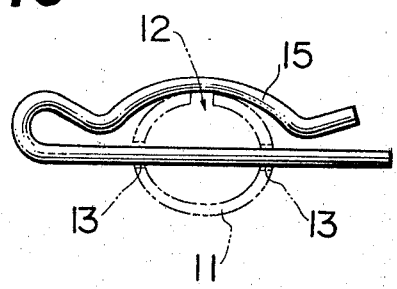
FIG. 6 is a front view showing another stopper.
Figure 7:
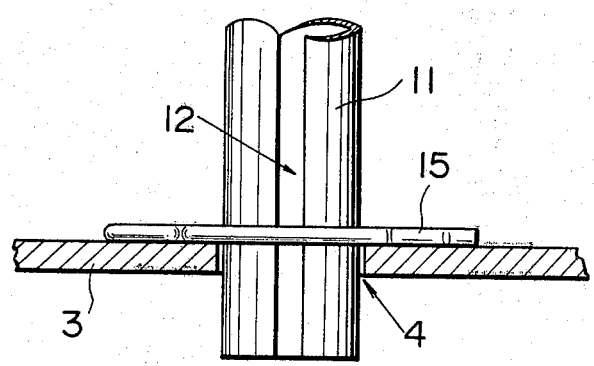
FIG. 7 is a sectional view showing a condition in which the support member shown in FIG. 5 is fixed to a roof rail by means of the stopper shown in FIG. 6.

FIGS. 5 through 7 show a further embodiment of the present invention. The support member 1 is the same as in the first embodiment shown in FIG. 2. A stopper 15 is formed as a spring pin or other pin. Such a stopper 15 is set through a hole or opening 13 formed laterally in the support member 1 near its end so that the support member 1 is fixed to the roof rail 3.

Figure 8:
FIGS. 8A and 8B show a pipe material which is used as a stopper of the type shown in FIG. 6.
Figure 8:
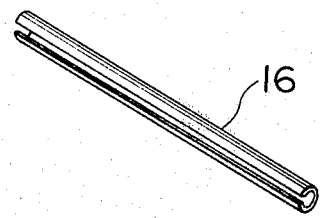

Such a pipe type stopper 14 may be made of a pipe material having a slit as shown in FIGS. 8A and 8B.

It is apparent that alternative stoppers and openings therefor can be formed in any other shape or construction.

A plurality of openings 13 are preferably formed in the support member 1 along its length at regular intervals. In such a case, the best opening can be selected among several openings 13 so that the distance between the openings 13 into which the stoppers 15 or 14 are set is exactly the same as that between the opposite holes 4 formed in the roof rail or rails 3.

Figure 1:
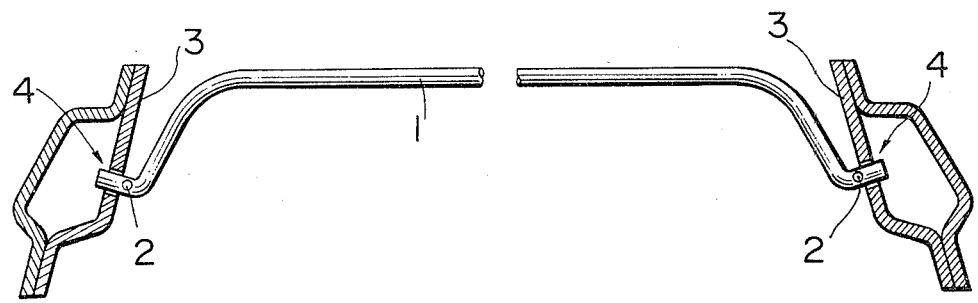
FIG. 1 is a schematic front view showing a conventional roof structure for an automotive vehicle with a part being omitted.

According to the present invention, as a support member is made of a hollow pipe, it is light, which can contribute to lightening of a vehicle body. Also, a stopper can be easily manufactured at least in comparison with the prior art described in reference to FIG. 1. The end portions of the support member are simple in construction because merely an opening or openings are formed therein. Such a stopper and support member arrangement can function in a desired simple and trouble free manner.

In addition, if a plurality of openings are formed in the support member in its longitudinal direction, any opening can be selected for a stopper so that the relative distance between the opposite stoppers can be adjusted easily. Thus, the contact points of the stopper and rail can be determined and adjusted in a simple manner. Errors in manufacture can be ignored to some extent. Even if diameters of the support members and openings are not uniform, the best fixing points can be obtained by selecting a preferred opening.

As a support member is separate from its stopper, each can be easily manufactured. Also, even if various diameters of openings are formed in the support member, various sizes of stoppers can be easily used.

Accordingly, a head lining can be lined in the best way.

Further, a standard support member can be used for various types of vehicles.

What is claimed is:

1. A roof structure for an automotive vehicle having a head lining and comprising:
a plurality of support members transversely disposed with respect to said head lining;
a pair of roof rails having a plurality of holes into which the support members are inserted at their ends so that the head lining is supported thereby;
the support members being made of a hollow tube;
the support members having small through-holes near their ends; and
a plurality of stop members each being separate from the support members, said stop member having a portion which is inserted into one of the through-holes of the support members and a stop portion projecting away from said support members for engaging the roof rails for limiting movement of the ends of said support members.

2. A roof structure as defined in claim 1 wherein each of the support members has a slit in their longitudinal direction through the whole length thereof and a plurality of through-holes are formed along the slit near the ends thereof.

3. A roof structure as defined in claim 1 wherein the inserted portion of each stop member is resiliently deformable for permitting insertion thereof into the through-hole of the support member.

4. A roof structure as defined in claim 1 wherein each of the stop members is a pin made of a tube.

5. A roof structure as defined in claim 1 wherein each of the stop members is formed in a R-like shape.

6. A roof structure for an automotive vehicle having a roof panel and a head lining comprising:
a pair of roof rails having a plurality of holes;
a support member fixed at both ends thereof to the roof rail for supporting the head lining under the roof panel;
the support member being made of a hollow pipe;
the support member having a plurality of openings in its longitudinal direction near each end thereof; and
a stopper, separable from the support member and having a portion thereof insertable through the opening of the support member for securing said stopper to said support member in such a manner that another portion of the stopper engages the roof rail whereby the insertion of the support member into the holes of the roof rail can be limited or controlled by said stopper.

7. A roof structure as defined in claim 6, wherein the openings are formed at regular intervals.

8. A roof structure for an automotive vehicle having a head lining and comprising:
a plurality of support members transversely disposed with respect to said head lining;
a pair of roof rails having a plurality of holes into which the support members are inserted at their ends so that the head lining is supported thereby;
the support members being made of a hollow tube;
the support members having small through-holes near their ends; and
a plurality of stop members each being separate from the support members, said stop member having a portion which is inserted into one of the through-holes of the support members and a stop portion projecting away from said support members for engaging the roof rails for limiting movement of the ends of said support members
each stop member having at least a portion thereof being resilient for securing said stop member to said support member.

* * * * *

UNITED STATES PATENT AND TRADEMARK OFFICE
CERTIFICATE OF CORRECTION

PATENT NO. :      4,423,902

DATED      :      January 3, 1984

INVENTOR(S) :     Kouichi YAOTANI et al

It is certified that error appears in the above-identified patent and that said Letters Patent is hereby corrected as shown below:

On the title page, Item 73, Assignee, should read:

--Nissan Motor Company, Limited and Kato Hatsujo Kaisha Limited, both of Yokohama-shi, Japan--

Signed and Sealed this

First Day of May 1984

[SEAL]

*Attest:*

*Attesting Officer*

GERALD J. MOSSINGHOFF

*Commissioner of Patents and Trademarks*